(12) United States Patent
Kajitani

(10) Patent No.: US 7,564,650 B2
(45) Date of Patent: Jul. 21, 2009

(54) HEAD APPARATUS HAVING A SLIDER WITH FIRST AND SECOND POSITIVE PRESSURE PARTS AND A NEGATIVE PRESSURE PART AND DISC DRIVE HAVING THE SAME

(75) Inventor: Osamu Kajitani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 454 days.

(21) Appl. No.: 11/432,123

(22) Filed: May 11, 2006

(65) Prior Publication Data
US 2007/0195461 A1 Aug. 23, 2007

(30) Foreign Application Priority Data
Feb. 17, 2006 (JP) .............................. 2006-040597

(51) Int. Cl.
*G11B 5/60* (2006.01)
(52) U.S. Cl. .............. 360/235.5; 360/235.6; 360/235.7; 360/236.2
(58) Field of Classification Search .............. 360/235.5, 360/235.6, 235.7, 235.8, 235.9, 236, 236.1, 360/236.2, 236.3, 235.4
See application file for complete search history.

(56) References Cited

U.S. PATENT DOCUMENTS

| | | | | |
|---|---|---|---|---|
| 6,072,662 | A * | 6/2000 | Utsunomiya | .............. 360/236.1 |
| 6,288,874 | B1 | 9/2001 | Ito | |
| 6,493,188 | B1 | 12/2002 | Tokisue et al. | |
| 6,760,193 | B1 * | 7/2004 | Kohira et al. | ............. 360/236.3 |
| 2004/0012887 | A1 * | 1/2004 | Rajakumar et al. | ........ 360/236.2 |
| 2004/0264052 | A1 * | 12/2004 | Mundt et al. | ............. 360/236.1 |
| 2004/0264053 | A1 * | 12/2004 | Pendray et al. | .......... 360/236.3 |
| 2005/0135012 | A1 * | 6/2005 | Kubotera | .................. 360/236.3 |
| 2005/0213253 | A1 | 9/2005 | Takahashi et al. | |
| 2005/0231851 | A1 | 10/2005 | Yoshida et al. | |

FOREIGN PATENT DOCUMENTS

| | | |
|---|---|---|
| EP | 1 447 796 | 8/2004 |
| JP | 2000-21111 | 1/2000 |
| JP | 2001-093250 | 4/2001 |
| JP | 2001-202732 | 7/2001 |
| JP | 2005-285218 | 10/2005 |

* cited by examiner

*Primary Examiner*—Jefferson Evans
(74) *Attorney, Agent, or Firm*—Greer, Burns & Crain, Ltd.

(57) ABSTRACT

A head apparatus includes a head that records information into and reproduces the information from a disc, a slider that supports the head, and flies above a surface of the disc when the disc rotates, the slider having a medium opposing surface that opposes to the disc, a positive pressure part that is formed on the medium opposing surface of the slider, generates a lifting power used to float the slider in cooperation with an airflow formed as the disc rotates, and defines a pitch angle of the slider, and a negative pressure part that is formed on the medium opposing surface of the slider, and decreases a flying height of the slider in cooperation with the airflow, wherein $(E/L) \times 100 \geq 6$ is met, where L is a length of the medium opposing surface along a direction from an inflow end to an outflow end of the airflow, and E is the shortest distance between the positive pressure part and the negative pressure part along the direction from the inflow end to the outflow.

5 Claims, 5 Drawing Sheets

HEAD APPARATUS HAVING A SLIDER WITH FIRST AND SECOND POSITIVE PRESSURE PARTS AND A NEGATIVE PRESSURE PART AND DISC DRIVE HAVING THE SAME

This application claims the right of a foreign priority based on Japanese Patent Application No. 2006-040597, filed on Feb. 27, 2006, which is hereby incorporated by reference herein in its entirety as if fully set forth herein.

BACKGROUND OF THE INVENTION

The present invention relates generally to a storage, and more particularly to a head apparatus that records information in and reproduces the information from a disc as a recording medium in a disc drive. The present invention is suitable, for example, for a head apparatus in a hard disc drive ("HDD").

Along with the recent spread of electronic apparatuses, there are increased demands for stably using HDDs in various circumstances, and for providing them less expensively. In the HDD, a head records the information in and reproduces the information from a disc while a slider floats above the disc. As the disc rotates, airflow occurs, which generates a lifting power or buoyancy for floating the slider from the disc plane. On the other hand, the suspension that supports the slider applies an elastic force to the slider against the lifting force. The conventional HDD controls the flying height of the slider by the lifting power through a balance between the lifting power (positive pressure) and the elastic force (load), or by maintaining positive pressure equal to load.

The elastic force is constant, whereas the positive pressure is sensitive to an air state, such as a concentration, a temperature, a humidity, and a viscosity. Consequently, the flying height is likely to be unstable in the conventional structure. When the slider is spaced from the disc with an excessively large flying height, the information cannot be recorded or reproduced. On the other hand, an excessively small flying height causes the slider to collide with the disc, and one or both of them to get damaged or recorded data to be erased due to the collision. Accordingly, it has recently been proposed to provide a negative pressure part to the slider in order to achieve (positive pressure)=(negative pressure)+(load). The negative pressure also depends upon the air state similar to the positive pressure, and its variation amount cancels out the variation amount of the positive pressure. The above scheme is thus advantageous in that the flying height becomes stable without being subject to influence of the air state.

Conventionally, the negative pressure part is arranged adjacent to the positive pressure that defines a pitch angle, because this arrangement can enhance the negative pressure effect and easily create the negative pressure. Therefore, a conventional slider 10 arranges a negative pressure part 16 just after a first positive pressure part via a wall 14, as shown in FIG. 6A, in an airflow direction X from an air inflow end IE to an air outflow end OE. FIG. 6B is a partial sectional view of FIG. 6A. The positive pressure part has an air bearing surface ("ABS") part 12a that effectuates the positive pressure, and a step part 12b that enhances the effect of the ABS part 12a. The positive pressure part includes a first positive pressure part 12A, a pair of second positive pressure parts 12B, and a third positive pressure part 12C. The first positive pressure part 12A is provided closest to the air inflow end IE, and defines a pitch angle of the slider 10. A pair of second positive pressure parts 12B are provided between the first and third positive pressure parts 12A and 12C, and maintains a right and left balance with respect to the X direction of the slider 10. The third positive pressure part 12C is provided closest to the air outflow end OE (near a head 20), and defines the flying height of the slider 10. The head 20 is provided at the center part close to the air outflow end OE of the slider 10.

Prior art includes, for example, Japanese Patent Applications, Publication Nos. 2000-21111, 2001-93250, and 2001-202732.

The negative pressure part 16 when provided just after the first positive pressure part 12A increases a drop in flying height (simply "drop" hereinafter") in the reduced pressure. FIG. 6C is a schematic sectional view showing a flotation of the slider 10 above the disc 2. As illustrated, the slider 10 flies as shown by a solid line in the normal pressure, but drops by about 2.5 nm as shown by a dotted line at an altitude of 3,000 m. Recently, many manufacturers guarantee of 3,000 m use. However, in order to avoid collisions between the slider 10 and the disc 2 due to the drop, the flying height in the normal pressure should be made higher by 2.5 nm. The head 20 suffers recording/reproducing difficulties in inverse proportion to the flying height, and this problem is revealed as degraded yield. For example, when the flying height is set higher by 2.5 nm in the normal pressure, the yield is low of the head 20 that can perform the recording/reproducing operation. The degraded yield results in the increased cost of the HDD.

BRIEF SUMMARY OF THE INVENTION

Accordingly, the present invention is directed to a head apparatus and a disc drive having the same, which have good operational stability to different use environments and economical efficiency.

A head apparatus includes a head that records information into and reproduces the information from a disc, a slider that supports the head, and flies above a surface of the disc when the disc rotates, the slider having a medium opposing surface that opposes to the disc, a positive pressure part that is formed on the medium opposing surface of the slider, generates a lifting power used to float the slider in cooperation with an airflow formed as the disc rotates, and defines a pitch angle of the slider, and a negative pressure part that is formed on the medium opposing surface of the slider, and decreases a flying height of the slider in cooperation with the airflow, wherein $(E/L) \times 100 \geqq 6$ is met, where L is a length of the medium opposing surface along a direction from an inflow end to an outflow end of the airflow, and E is the shortest distance between the positive pressure part and the negative pressure part along the direction from the inflow end to the outflow. This head apparatus improves the yield by about 10%, since the negative pressure part is spaced from the positive pressure part by a predetermined amount E defined by the above equation.

Usually, the slider has a plurality of positive pressure parts. These positive pressure parts include the above first positive pressure part that is formed closest to the inflow end, and defines the pitch angle of the slider, a third positive pressure part a second positive pressure that is formed closest to the outflow end, and defines a flying height of the slider, and a second positive pressure part that is located between the first and third positive pressure parts, and maintains a right and left balance with respect to a first direction from the inflow end to the outflow end of the slider. The negative pressure part is formed between the first and second positive pressure parts. In one embodiment, the distance E is on the line that halves the width of the medium opposing surface in a second direction orthogonal to the first direction and is parallel to the first direction.

When (E/L)×100≧10 is met, the drop in flying height becomes about 40%, and the yield improves by 10% to 20%. (E/L)×100≦40 is preferably met. An excessively large value of (E/L) causes an excessive decrease of the negative pressure and the slider cannot handle the air state changes, or a floatation from the inflow end to the outflow end is likely to become unstable. For example, a wall part that defines the negative pressure part and a pair of second pressure parts are combined and a single negative pressure part may be formed. The present invention is suitable for a Long Femto type slider that satisfies 0.85 mm≦L ≦1.85 mm.

A disc drive that includes the above head apparatus also constitutes one aspect of the present invention.

Other objects and further features of the present invention will become readily apparent from the following description of the preferred embodiments with reference to accompanying drawings.

DETAILED DESCRIPTION OF THE PREFERRED EMBODIMENTS

Figure 1:
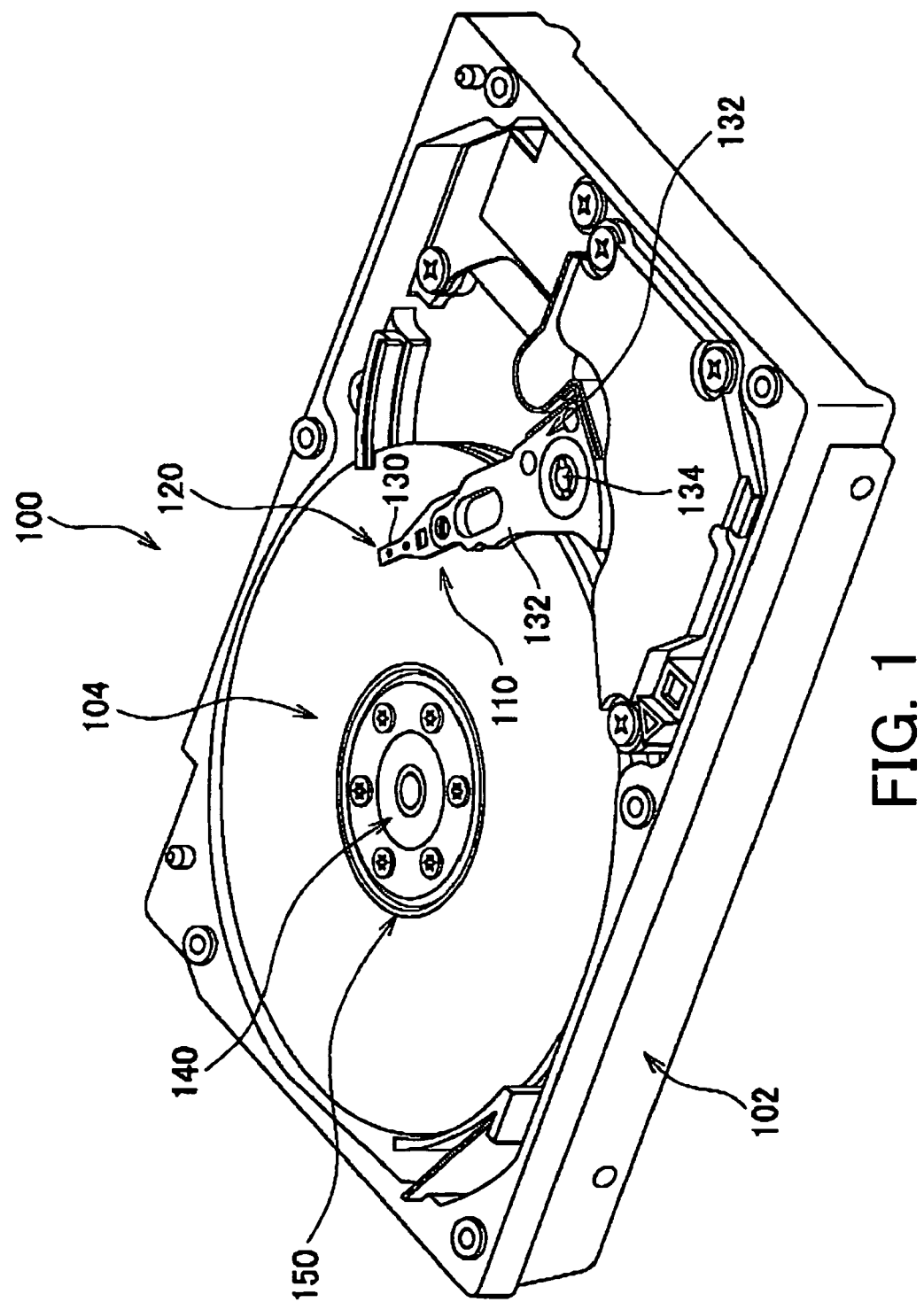
FIG. 1 is a plane view of an internal structure of a hard disc drive ("HDD") according to one embodiment of the present invention.

Referring now to the accompanying drawings, a description will be given of a HDD 100 according to one embodiment of the present invention. The HDD 100 includes, as shown in FIG. 1, one or more magnetic discs 104 each serving as a recording medium, a head stack assembly ("HSA") 110, a spindle motor 140, and a clamp ring 150 in a housing 102. Here, FIG. 1 is a schematic plane view of the internal structure of the HDD 100.

The housing 102 is made, for example, of aluminum die cast base and stainless steel, and has a rectangular parallelepiped shape with which a cover (not shown) that seals the internal space is joined. The magnetic disc 104 of this embodiment has a high surface recording density, such as 85 Gb/in$^2$ or greater. The magnetic disc 104 is mounted on a spindle of the spindle motor 140 through a center hole of the magnetic disc 104.

The HSA 110 includes a magnetic head part or head apparatus 120, a suspension 130, and a carriage 132.

Figure 2:
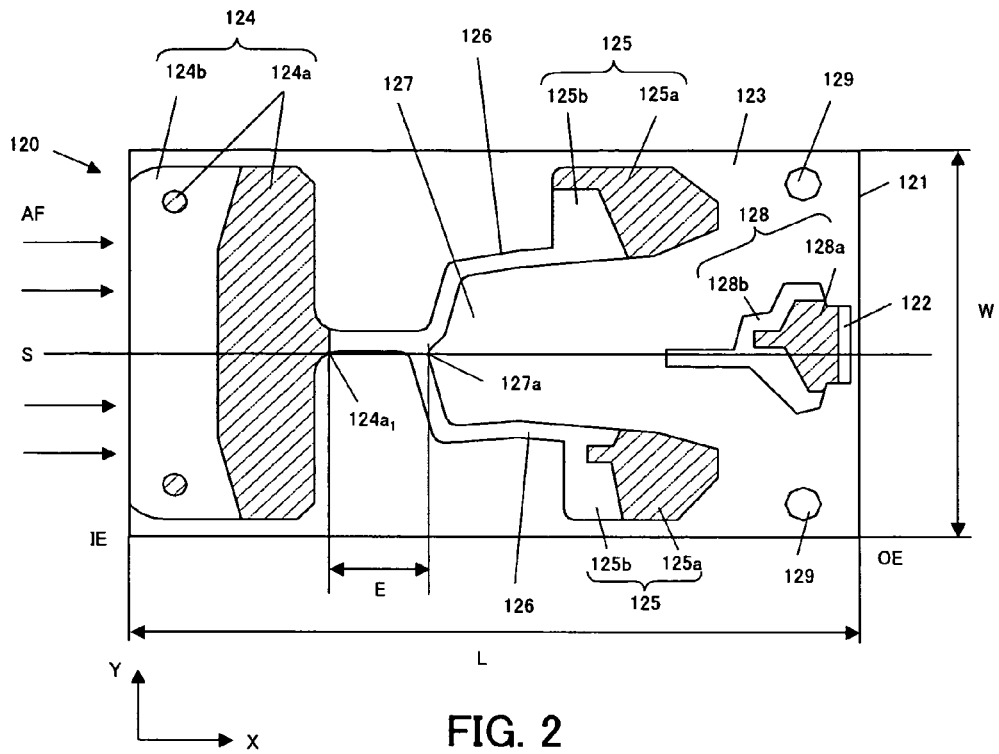
FIG. 2 is an enlarged plane view of a magnetic head part in the HDD shown in FIG. 1.

The magnetic head 120 includes, as shown in FIG. 2, a slider 121, and a head 122.

The slider 121 has an approximately square shape, and made of $Al_2O_3$—TiC (Altic), supports the head 122, and flies above the surface of the rotating disc 104.

The head 122 is mounted near the air outflow end OE of the slider 121, and serves as a read/write head that records information in and reproduces the information from the disc 104. The head 122 is formed as an $Al_2O_3$ (alumina) head device built-in film. Here, FIG. 2 is an enlarged plane view of the magnetic head part 120.

The slider 121 and the head 122 have a medium opposing surface that opposes to the magnetic disc 104, i.e., a floating surface 123. The floating surface 123 receives an airflow AF that occurs with rotations of the magnetic disc 104.

Formed on the floating surface 123 of the slider 121 are a first positive pressure part 124, a pair of second positive pressure parts 125, a wall part 126, a negative pressure part 127, a third positive pressure part 128, and a wall part 129.

X denotes a direction from the air inflow end IE to the air outflow end OE on the floating surface 123. Y denotes a direction orthogonal to the X direction. A length L denotes a distance of the floating surface 123 along the X direction. A width W denotes a distance of the floating surface 123 along the Y direction. More specifically, the length L and width W are distances projected on a plane parallel to the floating surface 123 like the XY plane shown in FIG. 2, and not subject to convexes and concaves on the floating surface 123. Line S is a straight line that halves the width W and is parallel to the X direction.

The slider 121 of this embodiment is a Long Femto type having a length L, a width W, and a height H satisfying 0.85 mm≦L≦1.85 mm, W=0.70 mm, and H=0.23 mm.

The Long Femto type is longer (in the longitudinal direction of the slider) than a Femto type (with a size of 0.85mm×0.70 mm×0.23 mm), and thus can easily secure a distance E, as described later. In addition, since the Femto type is usually formed by cutting a larger size from a wafer, the same number of Long Femto pieces can be cut from the wafer as the number of Femto pieces when the Femto type is replaced with the Long Femto type. Moreover, the Long Femto type has half an area of the floating surface 123 of a Pico Type (with a size of 1.25 mm×1.0 mm×0.3 mm), and remarkably reduces both the positive pressure amount and the negative pressure amount, exhibiting a larger drop. Therefore, the slider 121 of this embodiment is suitable for the Long Femto type.

All of the first positive pressure part 124, the second positive pressure parts 125, and the third positive pressure part 128 serve to generate the lifting power (positive pressure) for floating the slider 121 in cooperation with the airflow AF generated by the rotating disc 104.

More specifically, the first positive pressure part 124 defines a pitch angle of the slider 121, and has an approximately rectangular shape symmetrical with respect to the line S. The first positive pressure part 124 has an ABS part 124a that provides a positive pressure effect, and a step part 124b that enhances the lifting power generating function. The step part 124b is provided closer to the air inflow end IE than the ABS part 124a.

Figure 6A:
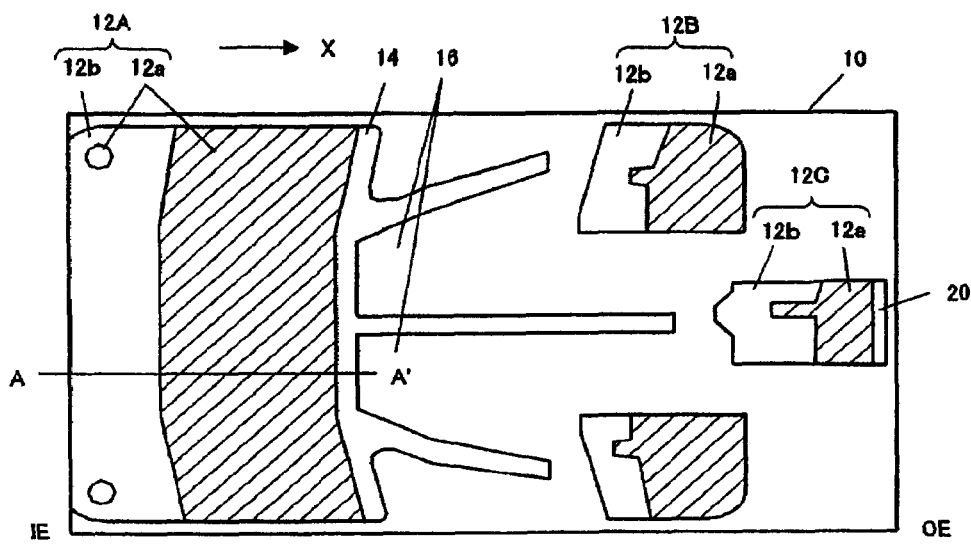
FIG. 6A is an enlarged plane view of the conventional magnetic head part.
Figure 6B:
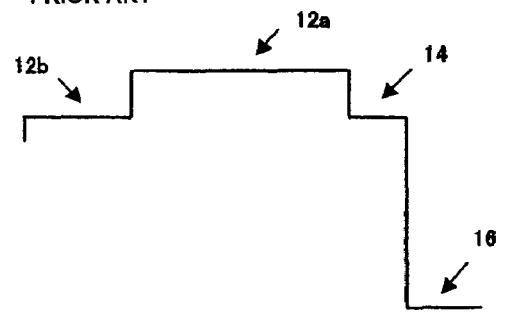
FIG. 6B is a schematic partial plane view of the magnetic head taken along a line A-A in FIG. 6A.
Figure 6C:
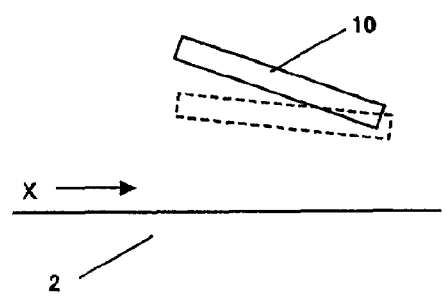
FIG. 6C is a schematic side view of a slider for explaining a drop.

A pair of left and right circular ABS parts 124a are formed near the air inflow end IE with respect to the line S, and the approximately rectangular ABS part 124a is formed just after the step part 124b and approximately symmetrical with respect to the line S. The step part 124b is formed approximately symmetrical with respect to line S from the air inflow end IE over the width. The ABS part 124a is higher than the step part 124b. The ABS part 124a is smaller in rectangular area than the ABS part 12a that is formed near the air inflow end IE shown in FIG. 6A, because the negative pressure part 127 is spaced from the ABS part 124a, as described later, and the reduced area can maintain the pitch angle.

A pair of areas that are located between the ABS part 124a and the wall part 126 and approximately symmetrical with respect to the line S are level with the negative pressure part 127.

More specifically, the pair of second positive pressure parts 125 serve to maintain the balance of the slider 121 in the Y direction, and a pair of left and right second positive pressure parts 125 are provided with respect to the line S, which will be described later. This pair is also referred to as side islands. The second positive pressure part 125 has an ABS part 125a that provides a positive pressure effect, and a step part 125b that enhances the lifting power generating function of the ABS part 125a. The step part 125b is provided closer to the air inflow end IE than the ABS part 125a. The ABS part 125a has a shape and size different from those of the ABS part 124a, but is level with the ABS part 124a. The step part 125b has a shape and size different from those of the step part 124b, but is level with the step part 124b. The second positive pressure parts 125 are formed in place approximately similar to that of the second positive pressure parts 12B shown in FIG. 6A, because the place is suitable for the side island to exhibit its function. In other words, the position of the second positive pressure part 125 cannot be moved drastically.

Figure 3:
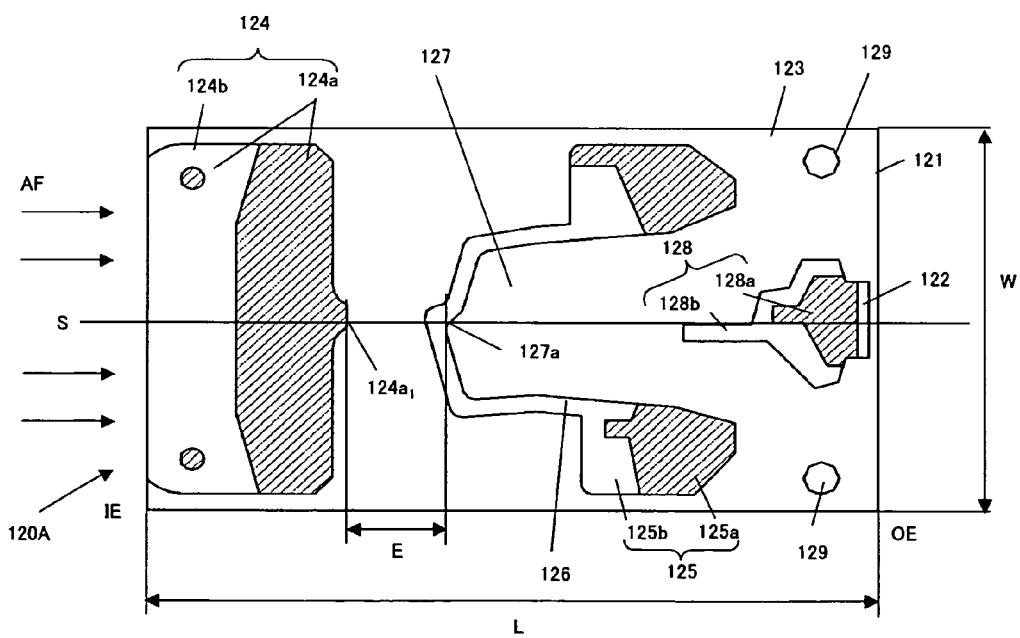
FIG. 3 is an enlarged plane view of a variation of the magnetic head shown in FIG. 2.

The wall part 126 is level with the step part 124b in this embodiment, and defines the negative pressure part 127. Although the wall part 16 is in three forks in FIG. 6A, it is in two forks in this embodiment. While the wall part 126 is combined with the step part 125b of the second positive pressure part 125, both have the same heights and it is not necessary to distinguish a boundary between them. While the wall part 126 is connected to the ABS part 124a and thus forms a Y shape as shown in FIG. 2, the wall part 126 may be disconnected from the ABS part 124a and thus has an approximately U shape as shown in FIG. 3. Here, FIG. 3 is a schematic plane view of the magnetic head 120A as a variation of the magnetic head part 120 shown in FIG. 3.

The negative pressure part or cavity part 127 serves to decrease the flying height of the slider 121 in cooperation with the airflow AF, and is formed between the first positive pressure part 124 and the second positive pressure parts 125. The negative pressure part 127 generates the negative pressure by shielding the air inflow end and the sides. The negative pressure part 127 is lower than each of the step part 124a and the wall part 126. An effective area of the negative pressure part 127 that actually provides the negative pressure effect is an area close to the U-shaped part defined by the wall part 126.

Figure 4:
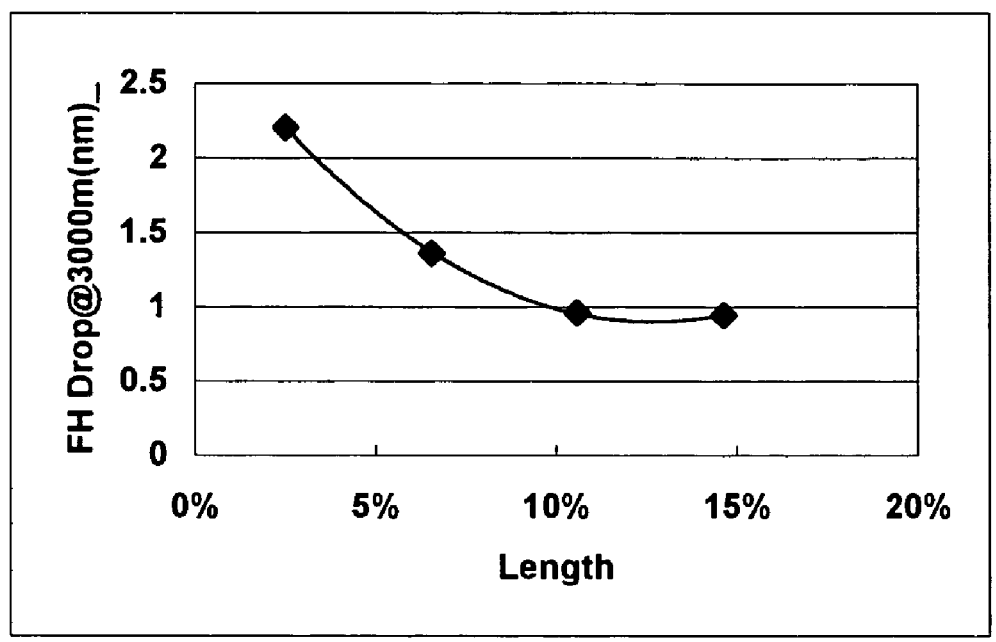
FIG. 4 is a graph showing a relationship between a drop in flying height and a distance between a first positive pressure part and a negative pressure part in a magnetic head part shown in FIG. 2.

The instant inventor has discovered that the conventional drop of 2.5 nm reduces as E increases, as shown in FIG. 4, where E is a distance along the X direction between the back end of the wall surface of the ABS part 124a in the first positive pressure part 124 at the OE side and the front end of the negative pressure part 127 at the IE side (or a OE-side back end of a portion of the wall part 126 connected to the ABS part 124a). In this embodiment, the distance E is the shortest distance between the ABS part 124a and the negative pressure part 127, and located on the line S. In this embodiment, the ABS part 124a has a convex 124a₁ that is a portion of the boundary with the wall part 126 projecting toward the OE side. On the other hand, the negative pressure part 127 has a convex 127a that is a portion of the boundary with the wall part 126 projecting to the IE side. The distance E is the shortest distance between the convex part 124a₁ and the convex 127a.

Here, FIG. 4 is a graph for explaining a relationship between the distance E and a drop reducing effect. In order to guarantee the operation of the HDD 100 at the altitude of 3,000 m, the drop means a drop of the slider 121 that is moved from the normal pressure position to a position higher by 3,000 m. FIG. 4 sets the ordinate axis to the drop (nm), and the abscissa axis to (E/L)×100 (a ratio of E to L)(%). It is said that when the drop decreases by 1 nm, the yield improves by about 10%. Therefore, when the conventional drop of 2.50 nm is reduced to 1.50 nm, the yield improvement is effectuated. From FIG. 4, the drop is reduced to 1.50 nm when E is greater than about 6%. From the above, E needs to satisfy Equation 1 in this embodiment.

$$(E/L) \times 100 \geq 6 \qquad \text{[EQUATION 1]}$$

More preferably, E satisfies Equation 2 because when E becomes 10% or greater, the drop reducing effect does not change so significantly and thus E of about 10% is sufficient.

$$(E/L) \times 100 \geq 10 \qquad \text{[EQUATION 2]}$$

Figure 5B:
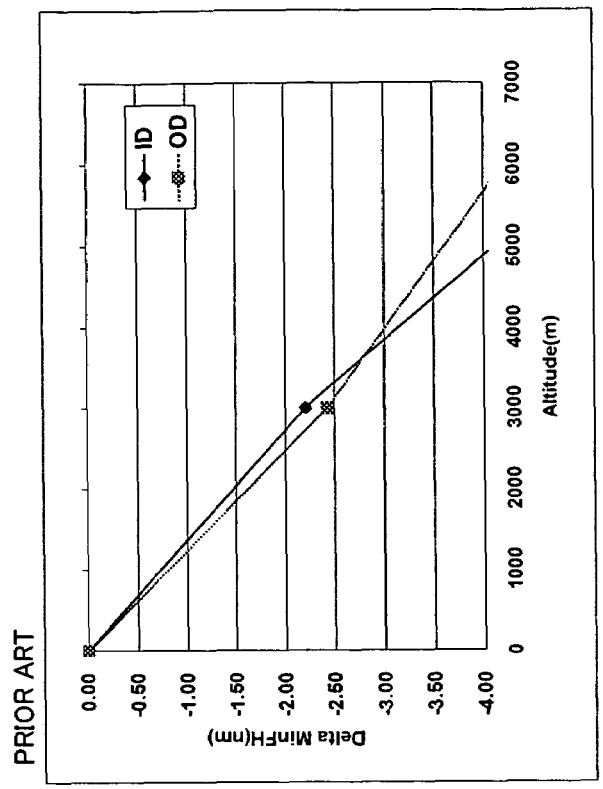
FIG. 5B is a graph showing a relationship between a drop in flying height and a distance between a first positive pressure part and a negative pressure part in a conventional magnetic head part.
Figure 5A:
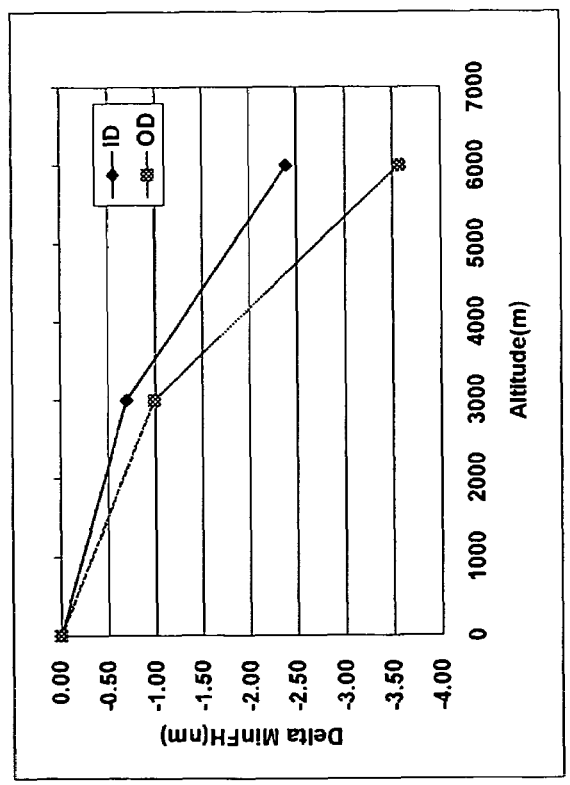
FIG. 5A is a graph showing a relationship between a drop in flying height and a distance between a first positive pressure part and a negative pressure part in a magnetic head part of this embodiment.

When Equation 2 is met, the drop reduces by about 40% from 2.5 nm to about 1.0 nm. FIG. 5A is a graph showing a drop of the slider 121, where ID denotes a drop of the slider 121 at the disc inner side, and OD denotes a drop of the slider 121 at the disc outer side. FIG. 5B is a graph showing a drop of the slider 10 shown in FIG. 6A, where ID denotes a drop of the slider 10 at the disc inner side, and OD denotes a drop of the slider 10 at the disc outer side. In FIGS. 5A and 5B, the ordinate axis denotes the drop (nm), and the abscissa axis denotes an altitude (m). Referring to FIG. 5B, when the air pressure changes from a position of the altitude of 0 (normal pressure) to the altitude of 3,000 m, the conventional slider 10 drops by about 2.5 nm at both the ID and OD. On the other hand, as shown in FIG. 5A, when the air pressure changes from a position of the altitude of 0 (normal pressure) to the altitude of 3,000 m, the inventive slider 121 drops by about 0.70 nm for ID and by about 1.0 nm for OD.

The inventive slider can reduce the drop of 2.5 nm in the conventional slider down to about 1 nm, and improves the yield by about 10% to 20%. Since the inventive yield is superior to that associated with the conventional slider structure shown in FIG. 6A, the manufacturer can provide 3,000 m guarantee and maintain the HDD 100 less expensive.

The slider 121 preferably satisfies Equation 3, because an excessively large value of (E/L) causes excessive decrease of the negative pressure and the slider cannot handle the air state changes.

$$(E/L) \times 100 \leq 40 \qquad \text{[EQUATION 3]}$$

More specifically, the third positive pressure part 128 serves to secure the flying height, and is provided closer to the air inflow end IE than the head 122. The third positive pressure part 128 has an ABS part 128a that provides the positive pressure effect, and a step part 128b that enhances the lifting power generating function of the ABS part 128a. The step part 128b is provided closer to the air inflow end IE than the ABS part 128a. The ABS part 128a has a shape and size different from those of the ABS part 124a, but is level with the ABS part 124a. The step part 128b has a shape and size different from those of the step part 124b, but is level with the step part 124b.

A pair of left and right wall parts 129 are provided near the air outflow end OE and symmetrical with respect to the line S. Each wall part 129 is level with the wall part 126, and maintains balance between the left and right of the slider 121 with respect to the line S.

The HDD's activation system may be a contact start stop ("CSS") system in which the magnetic head part 120 contacts the disc 104 at the stop time, or a dynamic or ramp loading system in which the magnetic head part 120 is lifted up from the disc 104 at the stop time and held on the ramp outside the disc 104 while the magnetic head part 120 does not contact the disc 104, and the magnetic head part 120 is dropped from the holding part to the disc 104 at the start time.

The head 122 is a MR inductive composite head that includes an inductive head device that writes binary information in the magnetic disc 104 utilizing the magnetic field generated by a conductive coil pattern (not shown), and a magnetoresistive ("MR") head that reads the binary information based on the resistance that varies in accordance with the magnetic field applied by the magnetic disc 104. A type of the MR head device is not limited, and may use a giant magnetoresistive ("GMR"), a CIP-GMR ("GMR") that utilizes a current in plane ("CIP"), a CPP-GMR that utilizes a perpendicular to plane ("CPP"), a tunneling magnetoresistive ("TMR"), an anisotropic magnetoresistive ("AMR"), etc.

The suspension 130 serves to support the magnetic head part 120 and to apply an elastic force to the magnetic head part 120 against the magnetic disc 104, and is, for example, a stainless-steel Watlas type suspension. The suspension 130 has a flexure (also referred to as a gimbal spring or another name) which cantilevers the magnetic head part 120, and a load beam (also referred to as a load arm or another name) which is connected to the base plate. The suspension 130 also supports a wiring part that is connected to the magnetic head part 120 via a lead etc. Via this lead, the sense current flows and read/write information is transmitted between the head 122 and the wiring part.

The carriage 132 swings around a support shaft 134 by a voice coil motor (not shown). The carriage 132 is also referred to as an "actuator", an "E-block" due to its E-shaped section or "actuator ("AC") block." A support portion of the carriage 132 is referred to as an "arm," and is an aluminum rigid member that can rotate or swing around the support shaft 134. The carriage 132 further includes a flexible printed circuit board ("FPC") that supplies a control signal, a signal to be recorded in the disc 104, and power to the disc 104, and receives a signal reproduced from the disc 104.

The spindle motor 140 rotates the magnetic disc 104 at a high speed, such as 10,000 rpm. The clamp ring 150 fixes the disc 104 onto the spindle motor 140.

In operation of the HDD 100, the spindle motor 140 is driven to rotate the disc 104. The airflow occurs with the rotations of the disc 104 between the disc 104 and slider 121, forming a minute air film. This airflow and the first to third positive pressure parts 124, 125 and 128 effectuate the lifting power for floating the slider 121 from the disc plane. On the other hand, the airflow and the negative pressure part 126 generate the negative pressure that weakens the lifting power applied to the slider 121. The suspension 130 applies an elastic compression force to the slider 121 in a direction opposing to the lifting power of the slider 121. This results in the balance of (lifting power or positive pressure)=(negative pressure)+(elastic force). Since this embodiment spaces the negative pressure part 126 from the ABS part 124a of the first positive pressure 124 by the predetermined length E, the drop of the slider 121 is only 1.0 nm in the altitude difference of 3,000 m or a corresponding air pressure difference. This embodiment enables the magnetic head part 120 that satisfies this condition to be manufactured with better yield than ever, improving the economic efficiency of the manufacturing of the 3,000 m guaranteed HDD 100.

The above balance spaces the magnetic head part 120 from the disc 104 by a constant distance. Next, the carriage 132 is rotated around the support shaft 134 for head's seek for a target track on the disc 104. In writing, data is received from a host (not shown) through an interface, modulated and supplied to the inductive head. Then, the inductive head writes the data in the target track. In reading, the MR head is supplied with a predetermined sense current, and reads desired information from a target track on the disc 104.

Further, the present invention is not limited to these preferred embodiments, and various modifications and variations may be made without departing from the spirit and scope of the present invention.

What is claimed is:

1. A head apparatus comprising:
   a head that records information into and reproduces the information from a disc;
   a slider that supports said head, and flies above a surface of the disc when the disc rotates, said slider having a medium opposing surface that opposes to the disc;
   a first positive pressure part that is formed on the medium opposing surface of said slider, generates a lifting power used to float said slider in cooperation with an airflow formed as the disc rotates, and defines a pitch angle of the slider;
   a second positive pressure part separate from said first positive pressure part and formed on the medium opposing surface of said slider, and configured to maintain a balance of said slider in a width direction perpendicular to a length direction from an inflow end to an outflow end of the airflow,
   a negative pressure part that is formed on the medium opposing surface of said slider, and decreases a flying height of said slider in cooperation with the airflow, a position of the negative pressure part which is closest to the first positive pressure part in the length direction being closer to the first positive pressure part than a position of the second positive pressure part which is closest to the first positive pressure part in the length direction,
   wherein $(E/L) \times 100 \geq 6$ is met, where L is a length of the medium opposing surface along the length direction, and E is the shortest distance between said first positive pressure part and said negative pressure part along the length direction.

2. A head apparatus according to claim 1, wherein $(E/L) \times 100 \geq 10$ is met.

3. A head apparatus according to claim 1, wherein $(E/L) \times 100 \leq 40$ is met.

4. A head apparatus according to claim 1, wherein $0.85 \text{mm} \leq L \leq 1.85 \text{mm}$.

5. A disc drive comprising a head apparatus according to claim 1.

* * * * *